United States Patent [19]

Hershtik et al.

[11] Patent Number: 5,790,236
[45] Date of Patent: Aug. 4, 1998

[54] MOVIE PROCESSING SYSTEM

[75] Inventors: Asher Hershtik, Dolev; Dani Rozenbaum, Rehovot, both of Israel

[73] Assignees: Elop Electronics Industries Ltd., Rehovot, Israel; Television Multilingue S.A., Geneve, Switzerland

[21] Appl. No.: 806,293

[22] Filed: Feb. 26, 1997

Related U.S. Application Data

[63] Continuation of Ser. No. 439,645, May 12, 1995.

[30] Foreign Application Priority Data

May 12, 1994  [IL]  Israel .................... 109649

[51] Int. Cl.⁶ ........................................ G03B 31/00
[52] U.S. Cl. ........................ 352/12; 352/15; 352/19; 352/25
[58] Field of Search .................. 352/5, 12, 15, 352/19, 25, 26, 27, 38, 40, 129

[56] References Cited

U.S. PATENT DOCUMENTS

| | | | |
|---|---|---|---|
| 1,865,028 | 6/1932 | Mallina | 352/12 |
| 2,628,288 | 2/1953 | Blaney | 369/14 |
| 3,003,390 | 10/1961 | Lukawiecki | 352/5 |
| 3,743,391 | 7/1973 | White | 352/5 |
| 3,912,383 | 10/1975 | Stutz | 352/129 |
| 3,995,946 | 12/1976 | Greenberg | 352/129 |
| 4,219,259 | 8/1980 | Olodort | 352/129 |
| 4,453,809 | 6/1984 | Hill et al. | 352/11 |
| 4,600,281 | 7/1986 | Bloomstein | |
| 4,746,994 | 5/1988 | Ettlinger | 360/13 |
| 4,930,956 | 6/1990 | Mantovani | |
| 5,040,081 | 8/1991 | McCutchen | 360/14.3 |
| 5,130,815 | 7/1992 | Silverman et al. | |
| 5,204,706 | 4/1993 | Saito | 352/129 |
| 5,280,314 | 1/1994 | Hymes | 352/129 |
| 5,339,166 | 8/1994 | LeBrat et al. | |
| 5,479,351 | 12/1995 | Woo et al. | 364/449 |

FOREIGN PATENT DOCUMENTS

| | | | |
|---|---|---|---|
| 378042 | 7/1990 | European Pat. Off. | |
| 378393 | 7/1990 | European Pat. Off. | G11B 27/024 |
| 540403 | 5/1993 | European Pat. Off. | |
| 2630572 | 10/1989 | France | G11B 27/02 |
| 677633 A5 | 6/1991 | Switzerland | |
| 2101795 | 1/1983 | United Kingdom | |
| 2226718 | 7/1990 | United Kingdom | G11B 27/00 |

OTHER PUBLICATIONS

Byte, vol. 18, No. 2, Feb. 1993, pp. 225–228 and 230, Davis, et al, The Mac Goes to the Movies.
Proceedings of the International Conference On Data Engineering, Vienna, Apr. 19–23, 1993, no. conf. 9, IEEE, pp. 381–390, Gibbs, et al., Audio/Video Databases: An Object–Oriented Approach.
Call it Amazing, by Jum St. Lawrence in "Videography".
Brochure from Dubner International, re Scene Stealer.
Sony brochure re BVE–9100.
Brochure from EVE, Espace Video Film in French and English.
pp. 3–8 and Fig. 1 from handbook from TDF–Cerim–Laboratoire Audiofrequence.
Pamphlet entitled Projet Aries Cahier Des Charges from Societe Aries.

*Primary Examiner*—David M. Gray
*Assistant Examiner*—Eric Nelson
*Attorney, Agent, or Firm*—Ladas & Parry

[57] ABSTRACT

This invention discloses an apparatus for apparatus for conducting a comparison of a plurality of versions of a movie which differ at least in their audio channels and for generating an editing list for an output movie on the basis of the comparison, the apparatus comprising a movie version synchronizer operative to compare a plurality of movie versions which differ at least in their audio channels and generating a signal representing the mutual synchronization of the plurality of movie versions and an output movie generator receiving the synchronization signal and operative to generate a signal representing an output movie editing list for an output movie.

9 Claims, 13 Drawing Sheets

MOVIE PROCESSING SYSTEM

This application is a continuation of application Ser. No. 08/439,645 filed on May 12, 1995.

FIELD OF THE INVENTION

The present invention relates to editing films.

BACKGROUND OF THE INVENTION

An article entitled "Call it amazing", by Jim St. Lawrence (Videography, pp. 36 onward) describes a technology which purports to recognize scene changes and to grab a frame or burst of frames upon detection of a scene change.

SUMMARY OF THE INVENTION

The present invention seeks to provide an improved system and method for editing films.

Preferably, the apparatus of the present invention is operative to receive a plurality of different language versions of a single movie and to generate therefrom a single "output" version of the movie which includes a plurality of sound channels respectively corresponding to the plurality of language versions. Typically, the different language versions differ somewhat in length or, more generally, differ somewhat as to the frames they include and therefore the apparatus of the present invention typically synchronizes the different language versions to one another before generating the output movie.

There is thus provided in accordance with a preferred embodiment of the present invention apparatus for conducting a comparison of a plurality of versions of a movie which differ at least in their audio channels and for generating an editing list for an output movie on the basis of the comparison, the apparatus including a movie version synchronizer operative to compare a plurality of movie versions which differ at least in their audio channels and generating a signal representing the mutual synchronization of the plurality of movie versions, and a editing list generator receiving the synchronization signal and operative to generate a signal representing an output movie editing list for an output movie.

Further in accordance with a preferred embodiment of the present invention the versions include different language versions of a movie.

Still further in accordance with a preferred embodiment of the present invention the output movie includes a multilanguage movie.

Additionally in accordance with a preferred embodiment of the present invention the multilanguage movie includes a plurality of sound tracks in a plurality of languages.

Further in accordance with a preferred embodiment of the present invention the time required to process an individual movie is comparable to the time required to run the individual movie.

Still further in accordance with a preferred embodiment of the present invention the apparatus is operative in real time.

Additionally in accordance with a preferred embodiment of the present invention the movie version synchronizer is operative to automatically read in the plurality of movie versions.

Further in accordance with a preferred embodiment of the present invention the apparatus also includes an editing workstation operative to generate an output movie in accordance with the editing list.

Still further in accordance with a preferred embodiment of the present invention the movie version synchronizer includes a movie version partitioner operative to partition each movie version into a sequence of movie version portions, and a movie version portion sequence alignment unit operative to compare and align the plurality of sequences corresponding to the plurality of movie versions.

Additionally in accordance with a preferred embodiment of the present invention each movie version portion includes a cut of the movie version.

Further in accordance with a preferred embodiment of the present invention the alignment unit employs the length of the portions as a criterion for comparing and aligning.

Still further in accordance with a preferred embodiment of the present invention the partitioner employs at least one first criterion to identify movie version portions and the alignment unit employs at least one second criterion to compare and align the sequences and the first and second criteria have at least one criterion in common.

Additionally in accordance with a preferred embodiment of the present invention the apparatus also includes a frame characterizing unit operative to compute a plurality of characteristics pertaining to each frame, wherein only the plurality of characteristics is compared by the movie version synchronizer.

Further in accordance with a preferred embodiment of the present invention the apparatus also includes a frame characteristic memory accessed by the synchronizer which is operative to store the frame characteristics.

Still further in accordance with a preferred embodiment of the present invention the output movie includes a sound track of a first movie version and video frames of a second movie version.

Additionally in accordance with a preferred embodiment of the present invention the first movie version includes a movie version in a selected language and having poor video quality and the second movie version includes a movie version in another language and having high video quality.

Further in accordance with a preferred embodiment of the present invention the first movie version includes a black and white movie version in a selected language and the second movie version includes a colored movie version in another language.

Still further in accordance with a preferred embodiment of the present invention the first movie version includes a movie version in a selected language and having poor video quality and the second movie version includes a movie version in another language and having high video quality.

There is also provided in accordance with a preferred embodiment of the present invention a method for conducting a comparison of a plurality of versions of a movie which differ at least in their audio channels and for generating an editing list for an output movie on the basis of the comparison, the method including comparing a plurality of movie versions which differ at least in their audio channels and generating a synchronization signal representing the mutual synchronization of the plurality of movie versions, and receiving the synchronization output and generating a signal representing an output movie editing list for an output movie.

Further in accordance with a preferred embodiment of the present invention the versions include different language versions of a movie.

Still further in accordance with a preferred embodiment of the present invention the output movie includes a multilanguage movie.

Additionally in accordance with a preferred embodiment of the present invention the multilanguage movie includes a plurality of sound tracks in a plurality of languages.

Further in accordance with a preferred embodiment of the present invention the time required to process an individual movie is comparable to the time required to run the individual movie.

Still further in accordance with a preferred embodiment of the present invention the method is operative in real time.

Additionally in accordance with a preferred embodiment of the present invention the comparing and generating step includes automatically reading in the plurality of movie versions.

Further in accordance with a preferred embodiment of the present invention the method also includes generating an output movie in accordance with the editing list.

Still further in accordance with a preferred embodiment of the present invention the synchronizing step includes partitioning each movie version into a sequence of movie version portions, and comparing and aligning the plurality of sequences corresponding to the plurality of movie versions.

Additionally in accordance with a preferred embodiment of the present invention each movie version portion includes a cut of the movie version.

Further in accordance with a preferred embodiment of the present invention the comparing and aligning step includes employing the length of the portions as a criterion for comparing and aligning.

Still further in accordance with a preferred embodiment of the present invention the partitioning step employs at least one first criterion to identify movie version portions and the comparing and aligning step employs at least one second criterion to compare and align the sequences and the first and second criteria have at least one criterion in common.

Additionally in accordance with a preferred embodiment of the present invention the method also includes computing a plurality of characteristics pertaining to each frame, wherein only the plurality of characteristics is compared in the comparing step.

Further in accordance with a preferred embodiment of the present invention the comparing and generating step also includes storing the frame characteristics.

Still further in accordance with a preferred embodiment of the present invention the output movie includes a sound track of a first movie version and video frames of a second movie version.

Additionally in accordance with a preferred embodiment of the present invention the first movie version includes a movie version in a selected language and having poor video quality and the second movie version includes a movie version in another language and having high video quality.

Further in accordance with a preferred embodiment of the present invention the first movie version includes a black and white movie version in a selected language and the second movie version includes a colored movie version in another language.

Still further in accordance with a preferred embodiment of the present invention the first movie version includes a movie version in a selected language and having poor video quality and the second movie version includes a movie version in another language and having high video quality.

BRIEF DESCRIPTION OF THE DRAWINGS

The present invention will be understood and appreciated from the following detailed description, taken in conjunction with the drawings in which.

Figure 1:
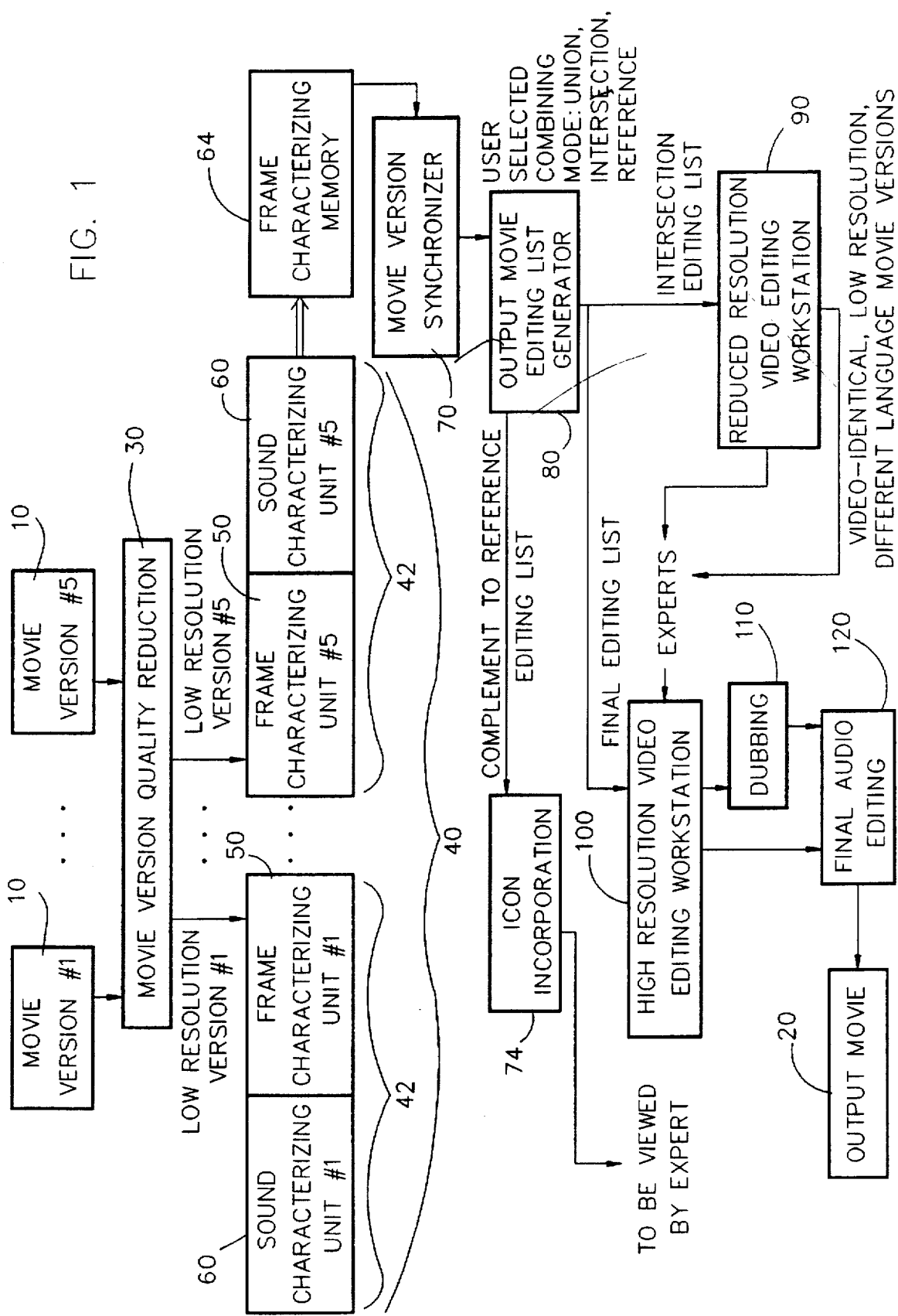
FIG. 1 is a simplified functional block diagram of movie comparing apparatus constructed and operative in accordance with a preferred embodiment of the present invention.
Figure 3:
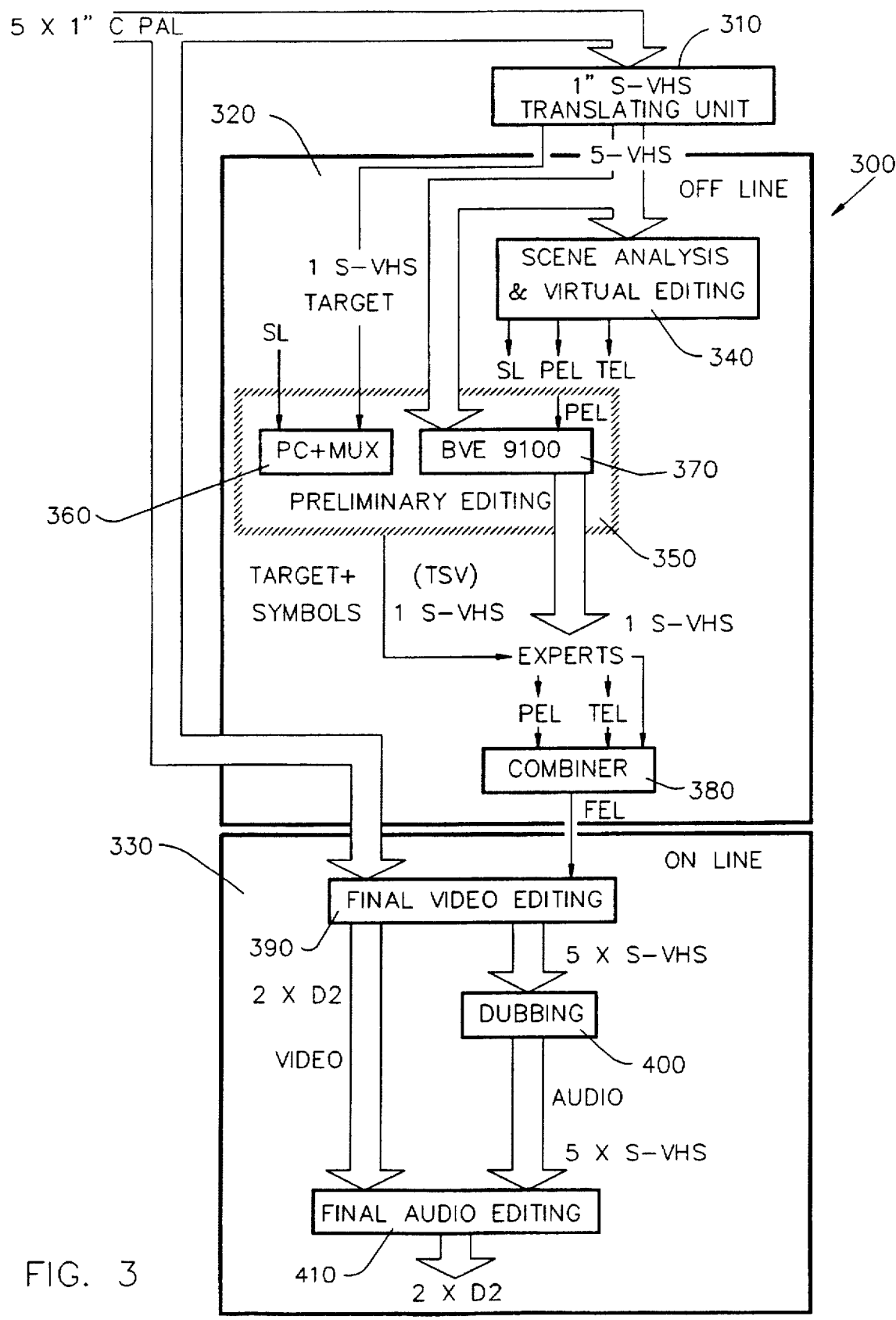
FIG. 3 is a simplified block diagram of a movie comparing system which is a sample implementation of the movie comparing apparatus of FIG. 1.

Attached herewith are the following appendices which aid in the understanding and appreciation of one preferred embodiment of the invention shown and described herein:

Appendix A is a listing of a preferred software implementation for an individual movie version characterizing unit 42 which corresponds to scene analysis and virtual editing unit 340 of FIG. 3; and Appendix B is a listing of a preferred software implementation for frame version synchronizer 70 and the output movie generator 80 of FIG. 1.

DETAILED DESCRIPTION OF PREFERRED EMBODIMENTS

Reference is now made to FIG. 1 which is a simplified block diagram of movie comparing apparatus operative to compare a plurality 10 of versions of a movie which differ at least in their audio channels, and to generate, on the basis of the comparison, an output movie 20.

The plurality of versions 10 may, for example, comprise up to five different language versions of a single movie, such as French, German and Italian versions of "Gone with the Wind". The versions may be provided on any suitable medium, such as a 1" C PAL video cassette.

Preferably, the resolution of the movie versions is reduced by a movie version resolution reducer 30 which, for example, may translate the video cassettes storing the movie versions 10 from 1" C PAL format to S-VHS format. Reduction of the movie version resolution allows rapid subsequent processing of the movie version.

The reduced-resolution movie versions 30 are read, preferably in real time, by an array 40 of movie version characterizing units 42. The array 40 preferably comprises a plurality of movie version characterizing units 42 operating in parallel and typically corresponding in number to the maximum number of movie versions which the system can handle. Each movie version characterizing unit 42 includes a frame characterizing unit 50 and, optionally, a sound characterizing unit 60.

The frame characterizing unit 50 is operative to compress the frames by generating a "profile" for each frame including a plurality of frame characteristics, which profile more compactly represents the frame than does the raster representation thereof. Each frame characteristic comprises a feature which is extracted from the raster representation of the frame. Preferably, only a small number of frame characteristics is employed, such as 6 frame characteristics. These characteristics are preferably stored in a frame characteristic memory 64 which may, for example, comprise a hard disk.

An alternative method for specifying the frame characterizing unit 50 may comprise an MPEG compression method, as is known in the art, which is operative to generate, for each frame, a compressed representation thereof which more compactly represents the frame than does the raster representation of the frame. Generally speaking, the compressed representation generated by MPEG compression methods comprises a representation of the differences between a frame being represented and a previous frame such as the preceding frame.

A preferred set of frame characteristics includes a "span" characteristic, a plurality of "box" characteristics such as four "box" characteristics, and a "median" characteristic, each of which are defined below:

a. "span": To compute this characteristic, the difference between each pixel in the current frame and the corresponding pixel in another frame such as the preceding frame is computed. The "span" is the proportion of pixels in the current frame for which the above difference falls within a predetermined region.

The above characteristic is useful in identifying "clear cuts" in which a sharp transition occurs between two movie-shots. A "cut" is used in the present specification to refer to the point at which one movie-shot ends and the next movie shot begins. Cuts may be either "clear", i.e. sharp, or gradual. A "movie-shot" is typically a sequence of frames shot by a single camera. A "movie-segment" is a sequence of frames which is processed as a unit in the apparatus disclosed herein.

Typically, to compute the "span" characteristic, a histogram of differences is computed. The "span" characteristic is believed to be more useful than comparing histograms of the gray levels of the current and preceding frames.

b. "Box": A characteristic gray value for each of a plurality of predetermined locations within the frame. For example, if the frame dimensions are 512×576, there may be four predetermined locations whose top left corners may be located, for example, at the following pixel locations: (256, 138); (256,310); (99,192); and (445,192), where (0,0) is located at the left top corner. Each location may comprise an array of 64×64 pixels and the characteristic gray value of each location may comprise a central value of the array such as the mean, mode or median value of the gray level values of the pixels in the array.

c. "Median": The median of the gray levels of the pixels included in the current frame. This characteristic is important in discerning occurrences of "fading" in which a smooth transition occurs between two scenes.

Preferably, the movie versions are compared on a frame by frame basis. If the movie versions are in color, typically, one band thereof, such as the green band, is compared on a frame by frame basis.

The most useful of the above characteristics in synchronizing movie versions is believed to be the "span" characteristic.

Each sound characterizing unit 60 generates at least one sound characteristic per time interval, such as the following 3 sound characteristics for:

a. Sound level—a sample of the amplitude of the sound channel within the time interval, typically 40 milliseconds.

b. Voice—A binary characterization of the sound as either voice or non-voice. Typically, characterization as voice/non-voice has an imperfect reliability of approximately 80%. Typically, the characterization as voice/non-voice is updated every 2 seconds.

c. Sound type—Characterization of sound in one of a plurality of categories such as: male voice, female voice, music, white noise (also termed herein "rain"), sudden loud noises (also termed herein "shot"), silence. Typically, the sound type is updated every 2 seconds.

Typically, the sound type characterization is performed independently of the voice/non-voice characterization.

Figure 2:
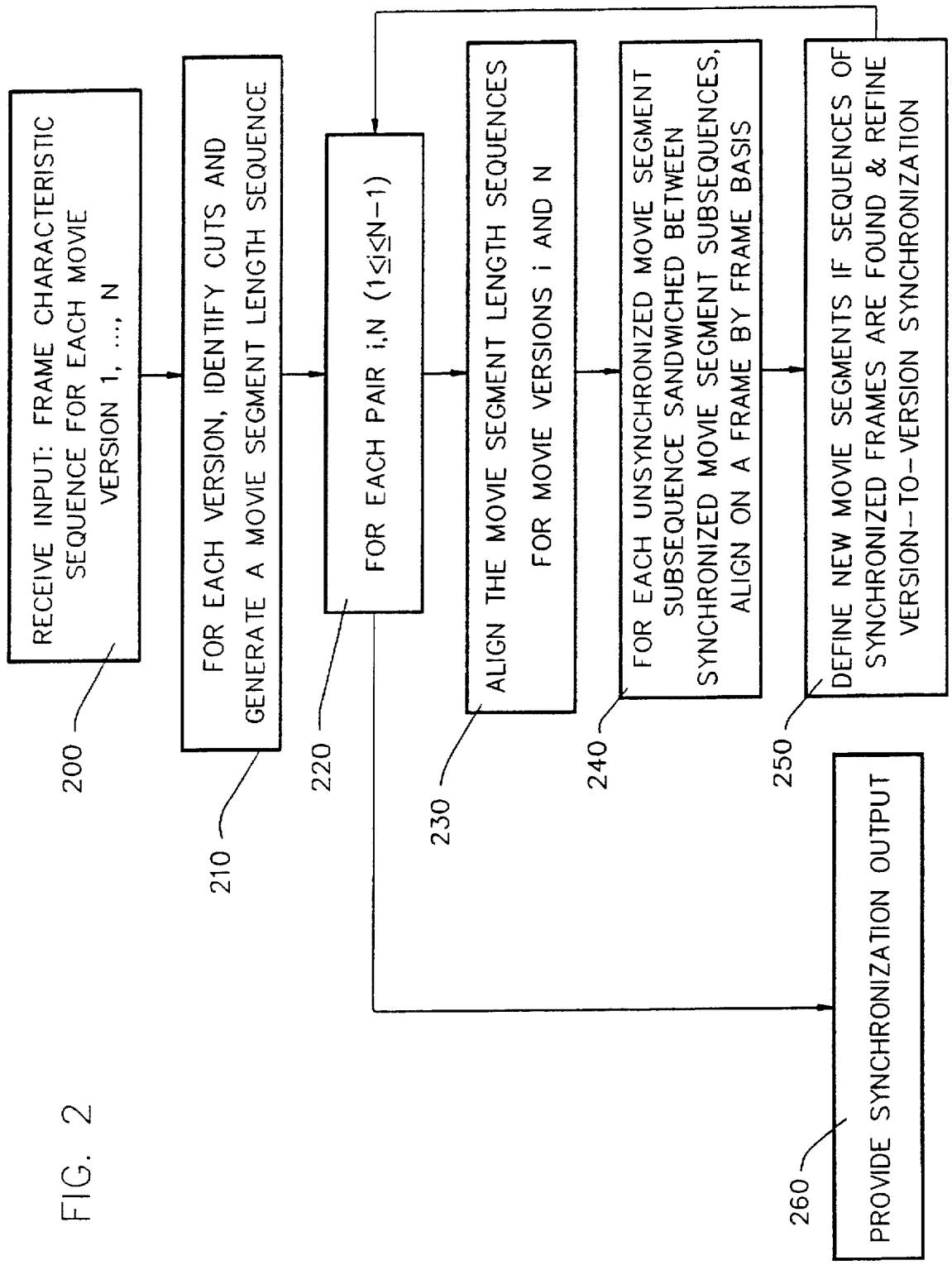
FIG. 2 is a simplified flowchart of a preferred method of operation for synchronizer 70 of FIG. 1.

A movie version synchronizer 70 analyzes the frame characteristics generated by frame characterizing unit 50 and provides a synchronization output indicating the mutual synchronization of the plurality of movie versions. Typically, the synchronization output includes a matrix storing, for each of a plurality of movie segments appearing in one or more versions, indications of all the versions in which that movie-segment appears. FIG. 2 is a simplified flowchart illustrating a preferred method of operation for the synchronizer 70 if the frame characterizing units 50 are operative to generate the above-described set of frame characteristics ("span", "box" and "median").

The output movie generator 80 produces at least one editing list in accordance with the synchronization output from the movie version synchronizer 70. Preferably, two editing lists are generated including:

a. Intersection editing list—an editing list including only movie-segments which are found to appear in all the input movie versions; and b. "Complement to reference" editing list—an editing list including those movie-segments which appear in a user-selected reference movie version but do not appear in the intersection editing list.

The "complement to reference" editing list is useful in allowing a user-selected reference movie version in language A to be generated in language B. To do this, the "complement to reference" editing list is applied to the language B version and any segments which appear in the language A reference version and do not appear in the language B version are dubbed.

It is appreciated that, alternatively or in addition, other types of editing lists may be generated such as a "union" editing list which includes all movie-segments which appear in at least one of the input movie versions.

The "complement to reference" editing list generated by output movie generator 80 is employed by an icon incorporation unit 74 which is operative to incorporate a plurality of icons, corresponding to the plurality of language versions, onto a user-selected reference movie version, such as version #1 in the illustrated embodiment which might, for example, be the English language version. Presence of the French language icon, for example, on a frame indicates that that frame appears in the French language version.

If it is desired to provide expert inspection of the proposed output movie before it is finalized, a reduced resolution video editing workstation 90 is provided which typically generates a plurality of low resolution "intersection" movie versions in a corresponding plurality of languages, using the "intersection" editing list generated by the output movie generator 80. All of the low resolution "intersection" movie versions include the same sequence of movie-segments, namely those movie-segments which appear in all of the input movie versions. However, each low resolution "intersection" movie version is in a different language. Alternatively, a plurality of low resolution "union" movie versions may be generated or a plurality of low resolution movie versions may be generated which each include the exact sequence of movie-segments appearing in a user-selected reference version from among the input movie versions.

The reduced resolution video editing workstation 90 may, for example, comprise:

a. 5 S-VHS players each receiving a corresponding one of low resolution movie versions #1 to #5;

b. A Sony 9100 editing table typically receiving and operating in accordance with the intersection editing list generated by output movie generator 80;

c. 5 S-VHS recorders operative to record the output of the Sony 9100 editing table, thereby to generate 5 low-resolution different language movie versions which typically differ only in their audio tracks.

One or more of the video-identical low resolution different language movie versions generated by workstation 90 may be viewed by an expert using conventional household equipment such as a household video system. If the expert believes that a movie-segment, omitted in the "intersection" low resolution movie version he is viewing, should be incorporated therein, the expert preferably views the iconed movie generated by icon incorporation unit 74 and determines whether or not to incorporate a particular movie-segment. If the decision is positive, the individual entry in the "complement to reference" editing list corresponding to the movie-segment to be incorporated is added to the "intersection" editing list. Once all expert-selected movie-segments have been incorporated, the modified "intersection" editing list becomes final.

The final editing list is received by a high resolution video editing workstation 100 which preferably generates an output movie including a single video track and a plurality of audio tracks typically including audio tracks in a plurality of different languages. The high resolution video editing workstation 100 preferably includes:

a. 5 1" players each receiving a corresponding one of high resolution movie versions #1 to #5, as indicated in FIG. 1 by reference numerals 10;

b. A Sony 9100 editing table typically receiving and operating in accordance with the final editing list generated by output movie generator 80, optionally in accordance with subsequent expert input;

c. One or more D2 recorders, depending on the number of movie versions being processed, operative to record the output of the Sony 9100 editing table, thereby to generate a single high resolution video track and 5 (in the illustrated embodiment) audio tracks including different language audio tracks which are synchronized to the high resolution video track.

If the final editing list differs from the intersection editing list, i.e. includes movie segments which do not exist in one or more of the input movie versions 10, then the audio content for these movie-segments is dubbed, in dubbing unit 110, in those languages for which no existing audio content is available.

Dubbed portions, if any, are incorporated into the appropriate audio tracks at the appropriate locations by final audio editing unit 120 which also is operative to perform general audio editing functions such as adjusting voice level so as to make voice level uniform throughout an individual audio track. The final audio editing operations may, for example, be carried out on the Sony 9100 editing table.

The output of the apparatus of FIG. 1 is an output movie 20, also termed herein a "combined movie", which includes a sequence of frames and a plurality of sound channels or sound tracks. For example, the plurality of sound channels may include at least one and preferably a plurality of different language versions and, optionally, an international version sound channel.

Reference is now made to FIG. 2 which is a simplified flowchart illustrating a preferred method of operation for the synchronizer 70.

The steps of the method of FIG. 2 preferably comprise the following:

STEP 200: Receive, from the frame characteristic memory 64 of FIG. 1, the sequences of frame characteristics for each of the movie versions 1, . . . , n which are to be synchronized.

STEP 210: For each movie version, identify cuts and generate a sequence of the lengths of each of the movie-shots in that movie version. At this stage, each movie shot comprises a movie-segment although at later stages in the method, movie segments do not necessarily correspond to movie shots.

Figure 4:
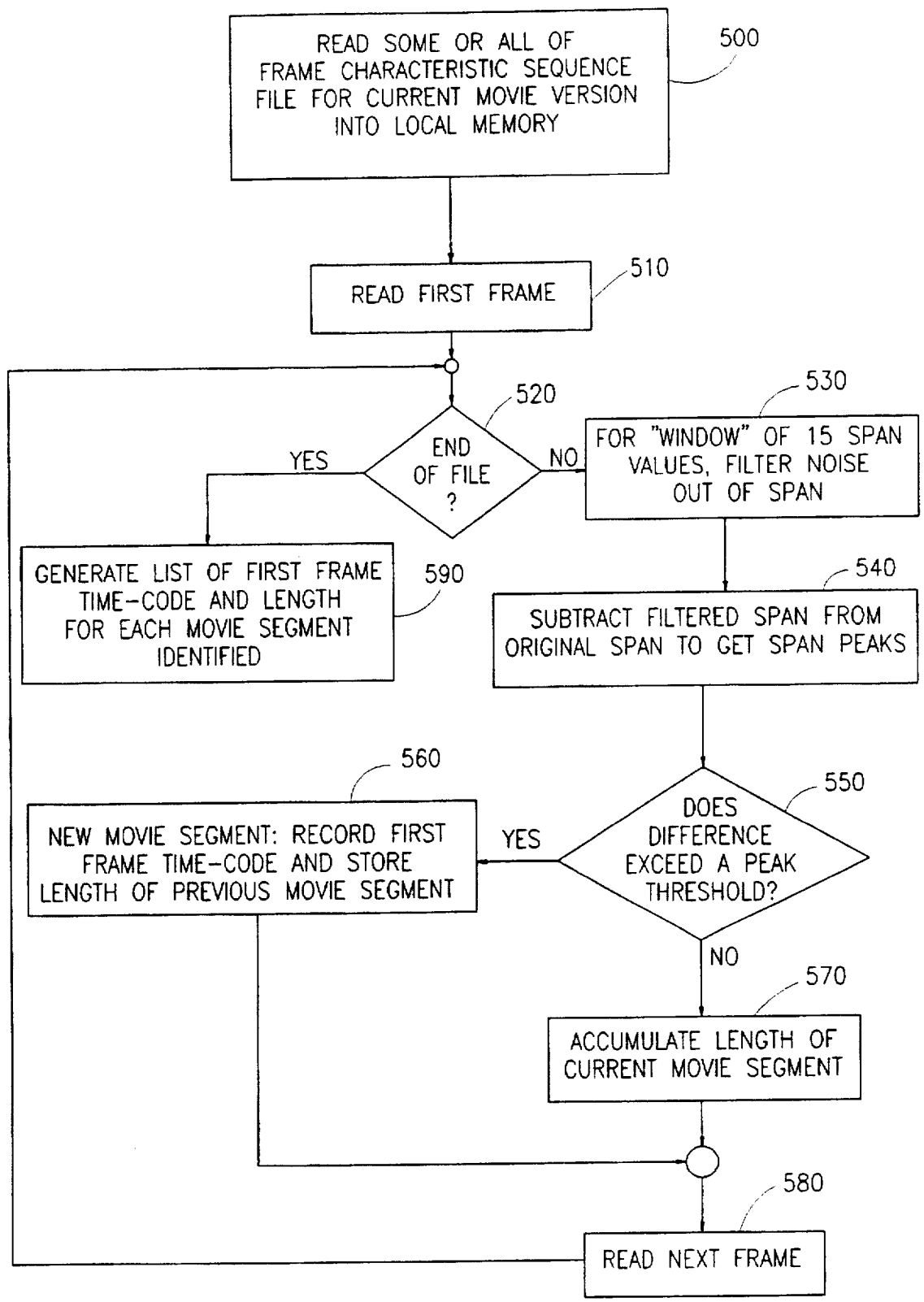
FIG. 4 is a simplified flowchart of a preferred method for performing step 210 of FIG. 2.

The cuts are identified on the basis of one or more of the frame characteristics described above. Typically, the cuts are identified by thresholding the "spans" of the frames which, in sequence, make up the film versions. Spans which exceed the threshold indicate a clear cut. A preferred method for performing step 210 is illustrated in FIG. 4.

STEP 220: Repeat steps 230, 240 and 250 for each pair of movie versions i and n, for 1<=i<=n−1:

STEP 230: Align the movie-segment length sequences for movie versions i and n. The output of the alignment step typically comprises pairs of synchronized subsequences of movie-segments which may or may not be interposed between non-synchronized subsequences of movie-segments.

Figure 5:
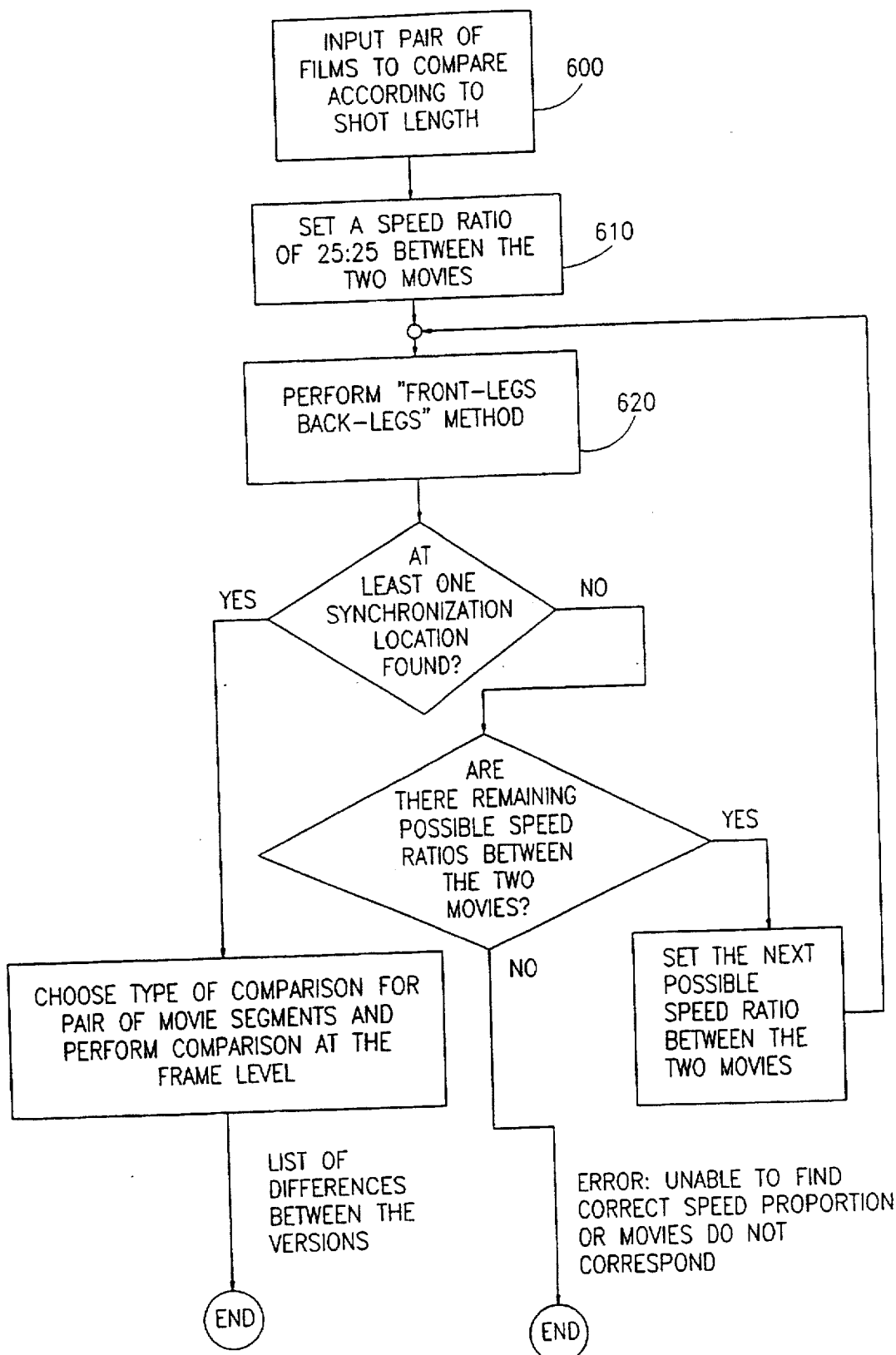
FIG. 5 is a simplified flowchart of a preferred method for performing step 230 of FIG. 2.

A preferred method for performing step 230 is illustrated in FIG. 5.

STEP 240: If there are unsynchronized movie-segment subsequences located between synchronized movie-segment subsequences, align the frames for each pair of unsynchronized movie-segment subsequences. For example, the following two lists are the lengths of a pair of movie-segment sequences excerpted from a pair of movie versions A and B, respectively. The excerpts from movie versions A and B include a pair of movie-segment subsequences (15, 17, 28, 32, 18; and 14, 18, 28) found to be unsynchronized located between synchronized movie-segment subsequences (20, 32, 13 and 27, 35):

Movie A excerpt: 20 32 13 15 17 28 32 18 27 35
Movie B excerpt: 20 32 13 14 18 28 27 35

The movie-segment subsequence 15, 17, 28, 32, 18 is compared and aligned with the movie-segment subsequence 14, 18, 28 on a frame by frame basis, on the basis of any suitable criterion for quantifying frame characteristics such as the span characteristic described above. This preliminary alignment is preferably enhanced by employing other characteristics such as the "box" characteristic. The above process is preferably carried out for each pair of corresponding segments. In the above example, for instance, the process might be carried out for the subsequences of lengths 15 and 14, then for the subsequences of lengths 17 and 18, then for the subsequences of lengths 28 and 28. The subsequences of lengths 32 and 18 from movie A are typically not compared and synchronized since, a priori they have no corresponding subsequences in movie B.

Figure 10:
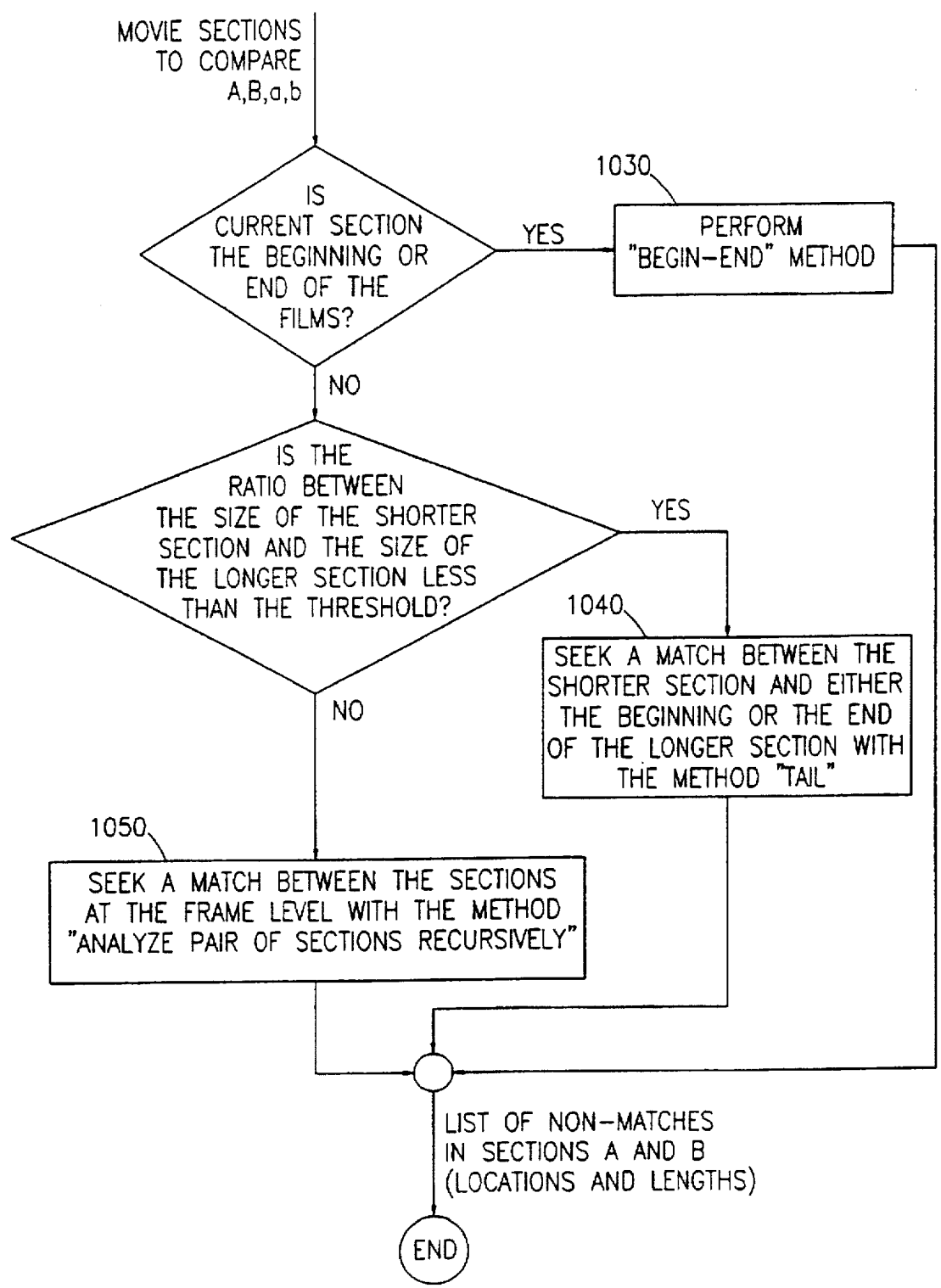
FIG. 10 is a simplified flowchart of a preferred method for comparing and aligning a single movie-segment with another movie-segment, on a frame-by-frame basis.

FIG. 10 illustrates a preferred method for comparing and aligning a single movie-segment, e.g. the segment of length 15 from movie A, with another movie-segment, e.g. the segment of length 14 from movie B, on a frame-by-frame basis. In FIG. 10, the symbol "A" represents the location of frames in movie version A; the symbol "B" represents the location of frames in movie version B; the symbol "a" represents the length of the section in movie version A; and the symbol "b" represents the length of the section in movie version B.

Typically, in order to align two movie versions, the movie version synchronizer compares and aligns the sequence of "span" characteristics for the frames in the first movie version to the same sequence for the frames of the second movie. The output of the alignment process typically comprises, for each frame in the first movie version, an indication of the time code of the putative aligned frame in the second movie version or an indication that there does not appear to be an aligned frame in the second movie version.

In the present specification, the terms "synchronize" and "align" are used to mean the process of attempting to match one sequence to another.

STEP 250: New movie-segments are defined if sequences of synchronized frames are found in step 240. Typically, the process of defining the new movie-segments is integrated with a process of refining or fine-tuning the putative segment-by-segment synchronization established in step 230 and the putative frame-by-frame synchronization established in step 240.

Figure 11:
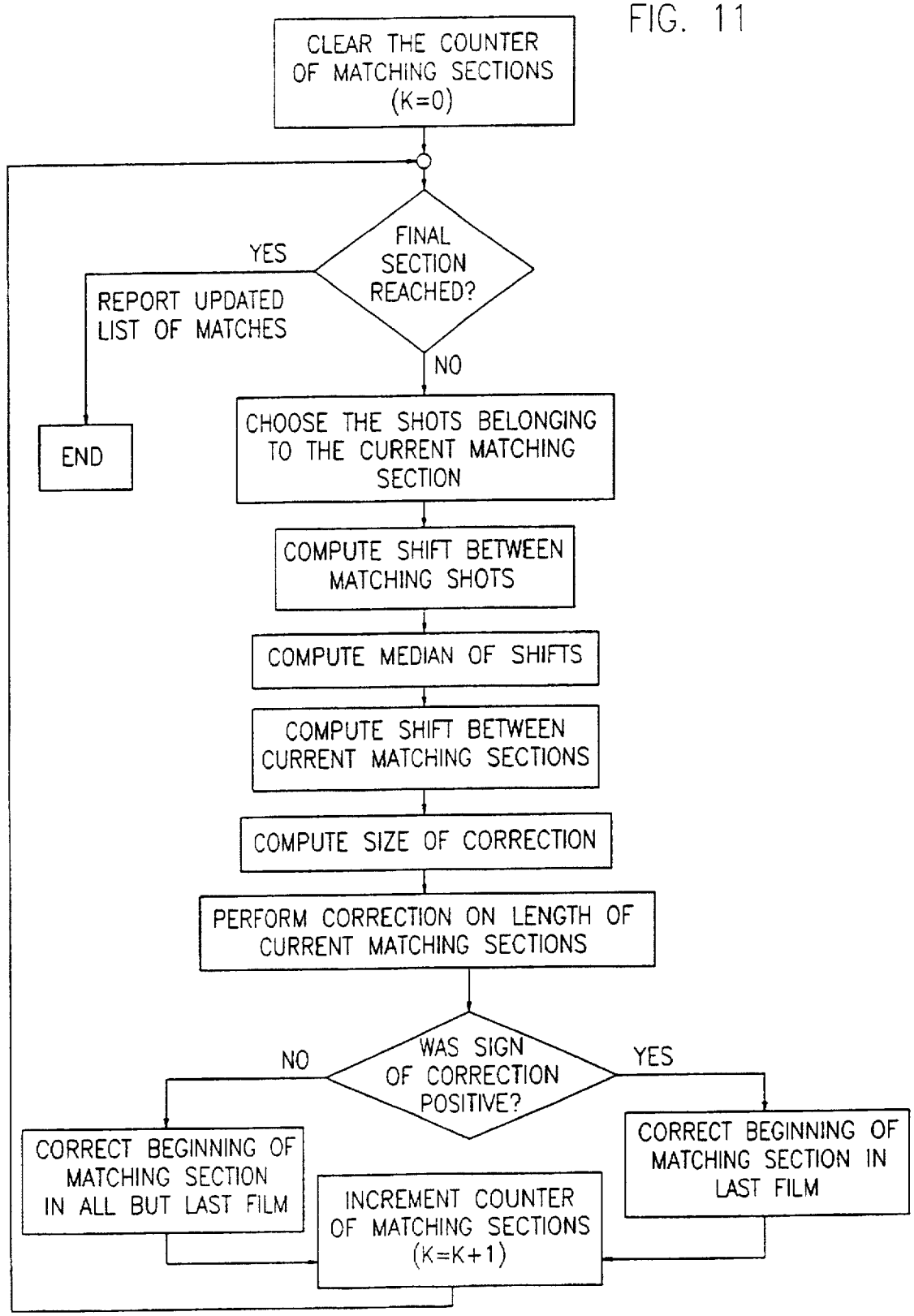
FIG. 11 is a simplified flowchart of a preferred method for carrying out the synchronization refinement step 250 of FIG. 2.

A preferred method for carrying out the synchronization refinement step 250 is illustrated in FIG. 11.

STEP 260: A synchronization output is provided which indicates the mutual synchronization of the plurality of movie versions. Typically, the synchronization output includes a matrix storing, for each of a plurality of movie segments appearing in one or more versions, indications of all the versions in which that movie-segment appears.

Reference is now made to FIG. 3 which is a simplified block diagram of a movie comparing system 300 which is a sample implementation of the movie comparing apparatus of FIG. 1. The system accepts up to 5 1" C PAL different video versions of the same film. The audio channel of the films differ by their languages, and the video can differ as to shot length, eliminated shots, or added shots. The languages may, for example, be French, English, German, Spanish, Italian.

The output of the system is 2×D2 tapes which contain a single video version, and 5 audio channels in 5 different languages.

The movie comparing system 300 includes a standard translating block 310, an off line subsystem 320 and an on line subsystem 330. The off line subsystem 320 includes the following units: a scene analysis and virtual editing unit 340 which performs the operation of functional blocks 42, 70 and 80 of FIG. 1, a preliminary editing unit 350 including a computer & multiplexer 360 and an editing table 370 such as a BVE 9100 commercially available from Sony, and a combiner 380.

The input to scene analysis and virtual editing unit 340 may comprises analog input, as in the embodiment of FIG. 3 or alternatively may comprise digital input.

The on line subsystem 330 includes a final video editing unit 390, a dubbing unit 400 and a final audio editing unit 410.

Sample inputs, outputs and operations of the above units are as follows:

1" to S-VHS Translating Unit 310

Input: up to 5, 1", C PAL tapes, each contains a different language version of the same film.

Output: up to 5, S-VHS C PAL formatted versions of the input tapes. 1 S-VHS reference identical to one of the 5 input tapes.

Operation: conversion of 1" C PAL into S-VHS C PAL standard.

Scene Analysis and Virtual Editing Unit 340

Input: up to 5 S-VHS C PAL formatted versions.
Target version tape name.
Image version tape name.

Output: Four files on three diskettes including:
PEL—Preliminary Editing List. Sequential editing commands in BVE 9100 editing language. Includes two files: 1. The EDL of the shortest version 2. The EDL of all other segments that appear in the Target and Image versions. The EDLs contain instructions for editing up to five synchronized films.
SL—Symbol Editing List. Sequential numbering of the original version shots. Information for each shot in the original version as to its absence or presence in each language version.
TEL—Translation Editing List Synchronization list of a sequential numbering list of the original version shots and each start and end of each shot on each version.

Operation: Analysis of the different versions, creating working files of different types.

BVE 9100 Unit 370:

Input: PEL—diskette, defined above.

Output: Up to 5 S-VHS copies of the original video, each with a different language synchronized to video.

Operation: BVE 9100 automatic editing according to PEL instructions.

PC+MUX Unit 360:

Input: S-VHS Target version tape SL—Symbol Editing List. Defined above

Output: TSV—Target Symbol Video S-VHS tape. This tape contains symbols overlaid in the original Target version. The symbols indicate the presence or absence of each shot in the different versions.

Operation: Employing SL information in order to overlay language symbol information onto the Target version.

Combiner Unit 380:

Input: recommendation list provided by human expert.
TEL—Translation Editing List diskette, provided by unit 340.
PEL—Preliminary Editing List diskette, provided by unit 340.

Output: FEL—Final Editing List, i.e. BVE editing instruction file.

Final Video Editing Unit 390

Input: Up to 5, 1", C PAL tapes, each containing a different version of the same film and FEL instructions.

Output: 2×D2 tapes which include 1 final video version and up to 5 preliminary audio versions. Up to 5 S-VHS formatted tapes each including identical final video and an audio track with a different language.

Operation: BVE 9100 automatic editing according to FEL instructions.

Dubbing Unit 400:

Input: Up to 5 S-VHS tapes each including identical final video and a different language.

Output: Up to 5 S-VHS tapes each including identical final video and final audio.

Operation: Complementary human dubbing

Final Audio Editing Unit 410:

Input : 2×D2 tapes which include 1 final video version and up to 5 preliminary audio versions. Up to 5 S-VHS tapes each including identical final video and final audio.

Output: 2×D2 tapes which include 1 final video version and up to 5 final audio versions.

Operation: Adding final audio onto 2×D2 final video.

Appendix A is a listing of a preferred software implementation for an individual movie version characterizing unit 42 of FIG. 1.

A preferred method for constructing a movie version characterizing unit 42 which is operative in conjunction with the remaining units of FIG. 1 is as follows:

a) Provide the following environment:

167 Motorola 8600 CPU on a VME bus;

Data Cube MV200 Image Processing Board;

Hard Disk with 500 Mbytes;

Console;

VTR with a time code audio output and remote 9 pin 422 protocol communication;

Two monitors with composite video input;

T102 Time Code Reader/Generator (Telcom Research)

RS32 to RS422 converter.

Both MV200 and Motorola 167 board communicate through a VME bus on which they are located. The system has an ethernet hardware connection, through which other computers can communicate.

LYNX operating system.

b) Generate, in an executable file called RUN, a binary list of an executable program to be entered as a binary file into the computer, using the listing of Appendix A.

c) Connect up the system as follows:

Connect video output of the VTR to the MV200 video output;

Connect video output of MV200 to the video output of monitor;

Connect TC output of VTR to time code reader;

Connect RS232 output of time code reader to RS232 port 1 of the Max Tower;

Connect 9 pin output of VTR to RS232–RS422 converter, and connect converter to RS232 port 2 of Max Tower;

Connect monitor video output of VTR to a monitor.

Appendix B is a listing of a preferred software implementation for frame version synchronizer 70 and output movie generator 80 of FIG. 1.

A preferred method for constructing units 70 and 80 so as to be operative in conjunction with the remaining units of FIG. 1 is as follows:

a) Generate, in an executable file called prjalone, a binary list of an executable program to be entered as a binary file into the computer, using the listing of Appendix B.

b) Run the program prjalone by supplying a command line in substantially the following form:

prjalone arg1 arg2 arg3 arg4 arg5 where arg1 represents the number of versions to process; arg2 represents the names of the versions; arg3 represents the target version number; arg4 represents the picture version; and arg5 represents the prefix for the name of the output file to receive the EDL, where the EDL is written to a file whose name is the prefix followed by J.edl and the additions to the common version are written to a file whose name is the prefix followed by R.edl.

For example, in order to process two versions of a movie called film, having the first version as the target version and the second version as the picture version, and the EDL written to files with the prefix Fi, the appropriate command line to supply would be:

prjalone 2 film_ver1 film_ver2 0 1 Fi

Reference is now made to FIG. 4 which is a simplified flowchart of a preferred method for performing step 210. The method of FIG. 4 is generally self-explanatory except for the following remarks:

STEP 530: It is appreciated that the window may be of any suitable width and that the value of 15 is merely exemplary. A suitable filter is, for example, a median filter.

STEP 550: Typically, the differences are within the range of 0 to 100 and a suitable threshold for differentiating peaks from non-peaks is 50.

Reference is now made to FIG. 5, which is a simplified flowchart of a preferred method for performing step 230 of FIG. 2. The method of FIG. 5 is generally self-explanatory except for the following remarks:

In FIG. 5, a sequence of n movie-segments from a first movie version is considered "synchronized" with respect to a sequence of n movie-segments from a second movie version if the lengths of the n movie segments in the first movie version are, respectively, equal or almost equal to the lengths of the n movie segments in the second movie version.

In FIG. 5, the speed ratio between two movies is referred to. Movies are generally filmed at some particular speed, measured in frames per second. Commonly, the possible speeds are 25 frames per second and 24 frames per second. Thus, the possible speed ratios referred to in FIG. 5 are 25:25, 25:24, 24:25, and 24:24. In the method of FIG. 5, when no synchronization location at all is found, a new speed ratio is set from the possible speed ratios in order to attempt the comparison again.

Figure 6A:
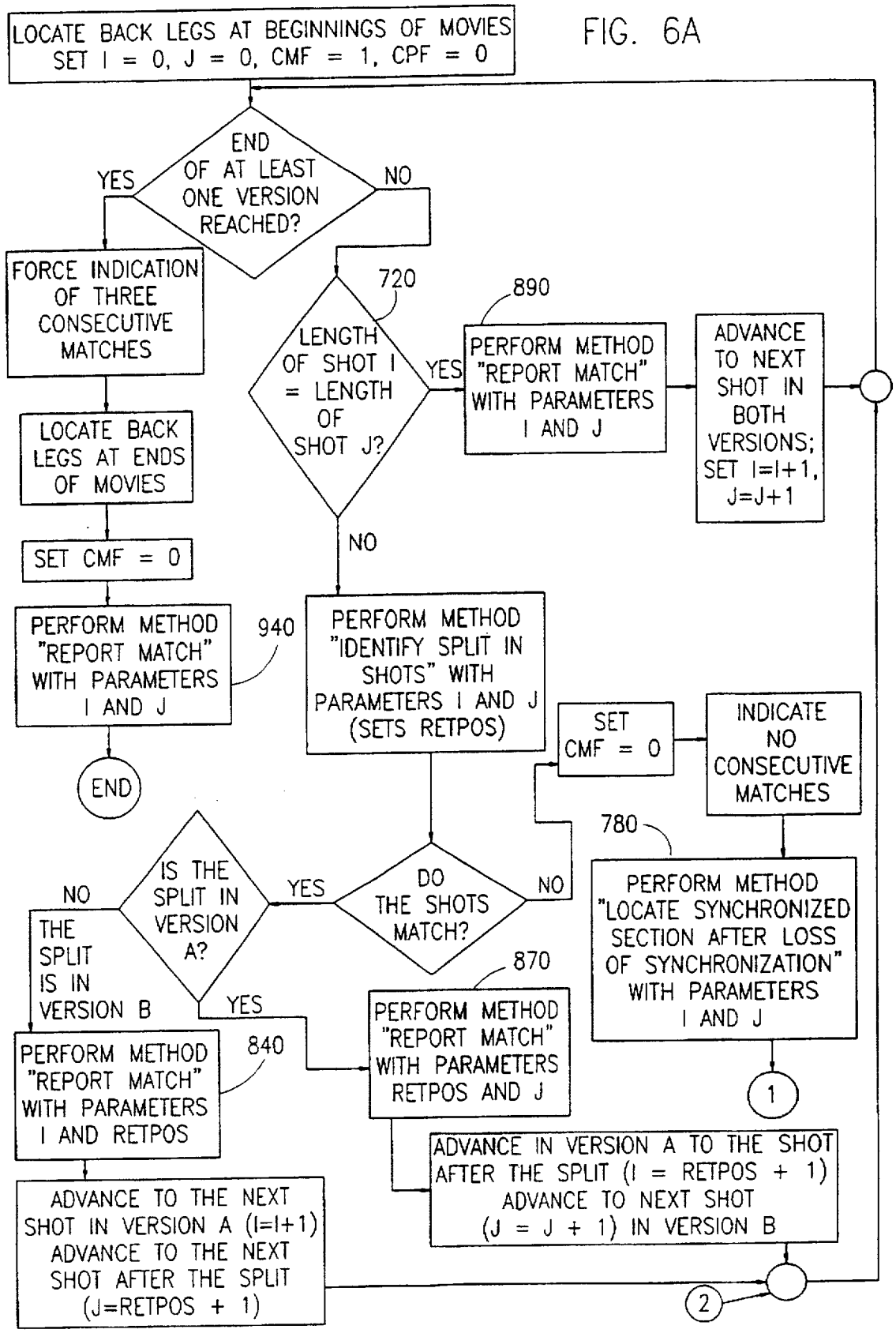
FIGS. 6A and 6B, taken together, form a simplified flowchart of a preferred method for performing step 620 of FIG. 5 in which movie segment-level synchronization is performed by repeatedly repositioning the "front legs" and "back legs" of a first movie segment sequence in a first movie version and a second movie segment sequence in a second movie version so as to synchronize the two movie segment sequences.
Figure 6B:
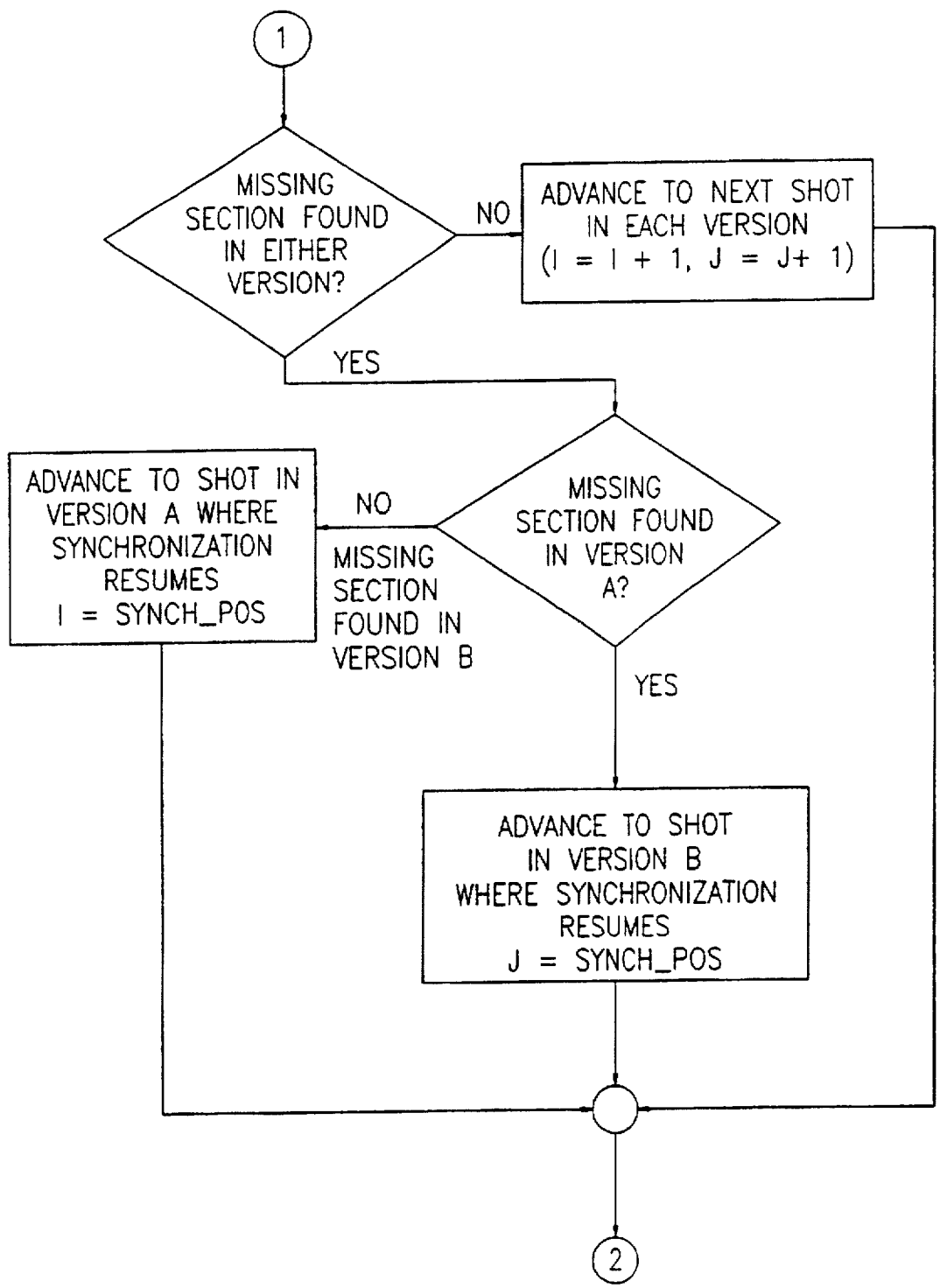

Reference is now made to FIGS. 6A and 6B which, taken together, form a simplified flowchart of a preferred method for performing step 620 of FIG. 5 in which movie segment-level synchronization is performed by repeatedly repositioning the "front legs", or beginning, and "back legs", or end, of a first movie segment sequence in a first movie version and a second movie segment sequence in a second movie version so as to synchronize the two movie segment sequences. The method of FIGS. 6A and 6B is generally self-explanatory except for the following remarks:

In FIGS. 6A and 6B the following symbols are used:

I refers to the shot number in version A;

J refers to the shot number in version B;

CMF refers to the consecutive match flag, which tracks whether or not a consecutive matching sequence has been found; and CPF refers to the correct proportion flag, which indicates whether or not the speed proportion between the movies is correct.

Figure 7:
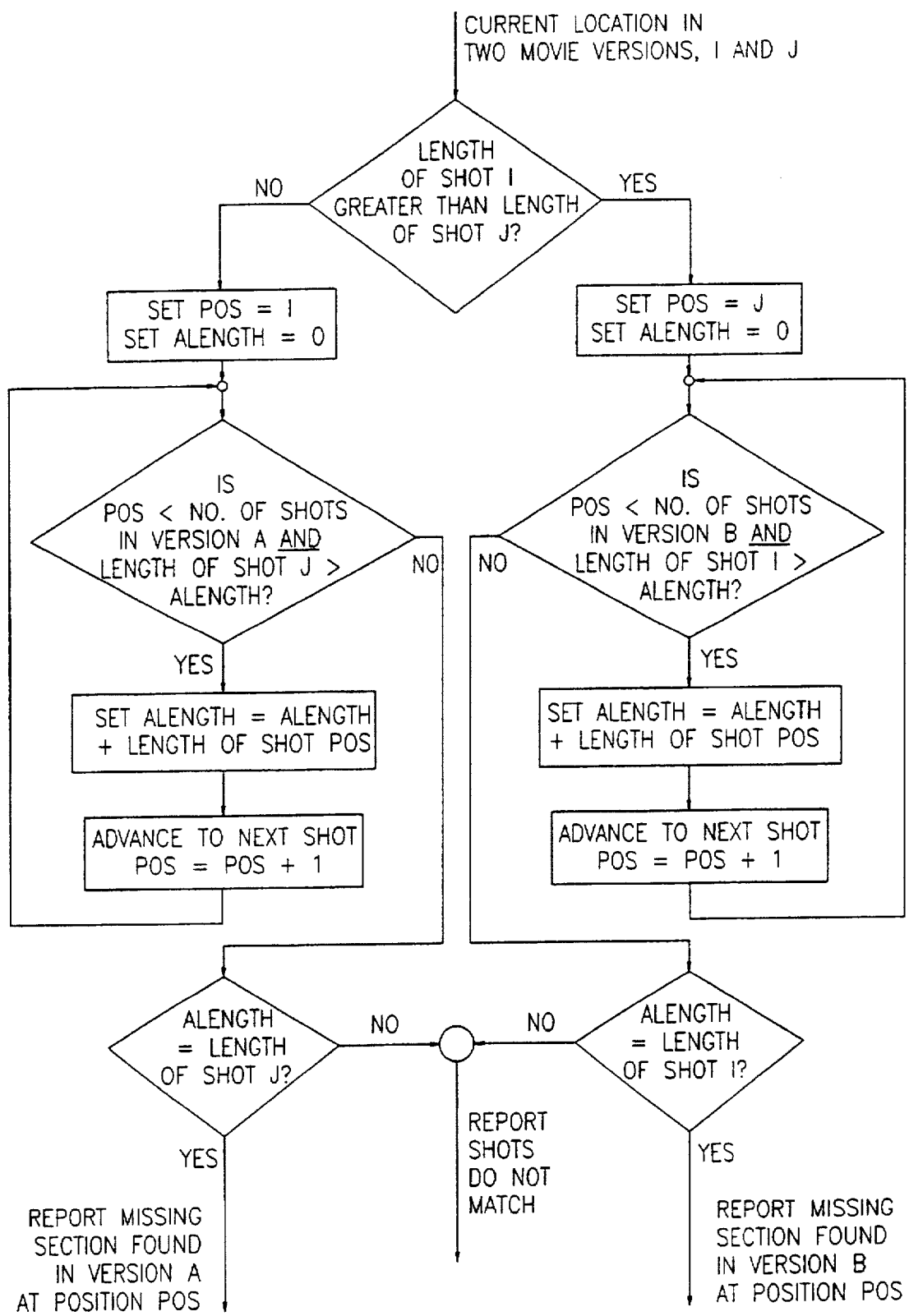
FIG. 7 is a simplified flowchart of a preferred method for performing step 720 of FIG. 6A.

STEP 720: Check if the length of shot I is equal to the length of shot J. A preferred method for performing step 720 of FIG. 6A is illustrated in FIG. 7.

Figure 8A:
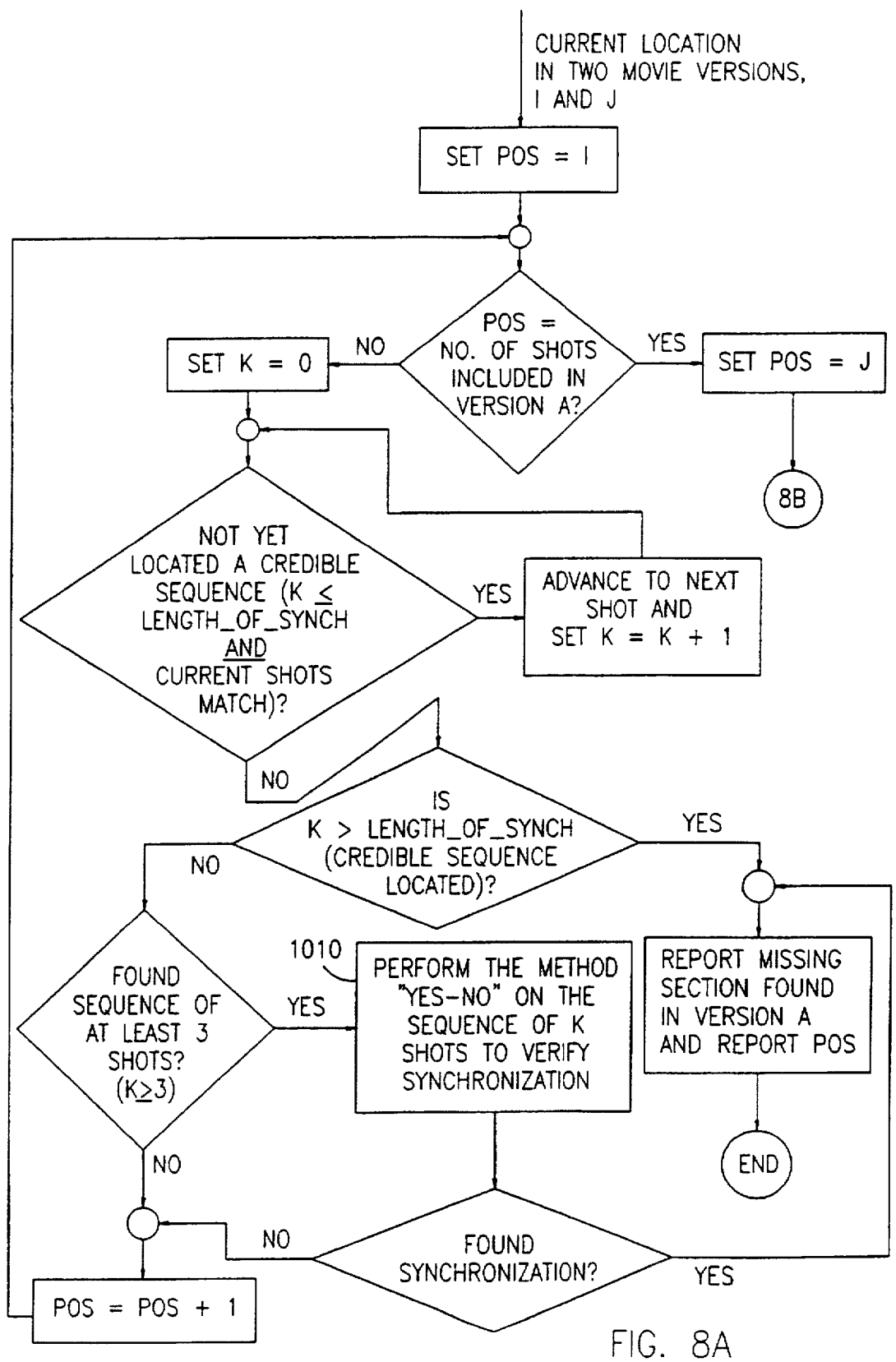
FIGS. 8A and 8B, taken together, form a simplified flowchart of a preferred method for performing step 780 of FIG. 6A.
Figure 8B:
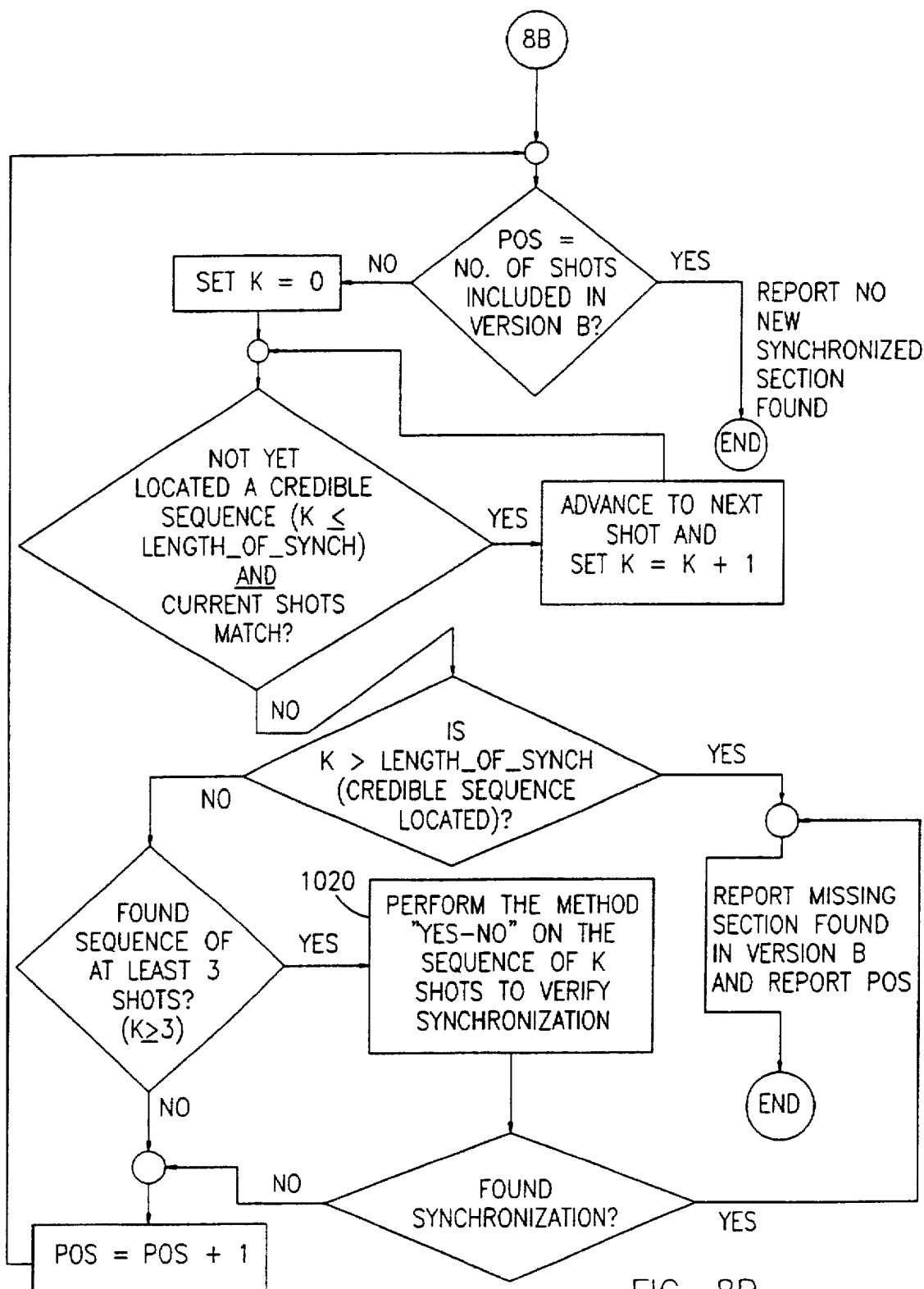

STEP 780: Perform method "locate synchronized section after loss of synchronization" with parameters I and J. A preferred method for performing step 780 of FIG. 6A is illustrated in FIGS. 8A and 8B.

Figure 9:
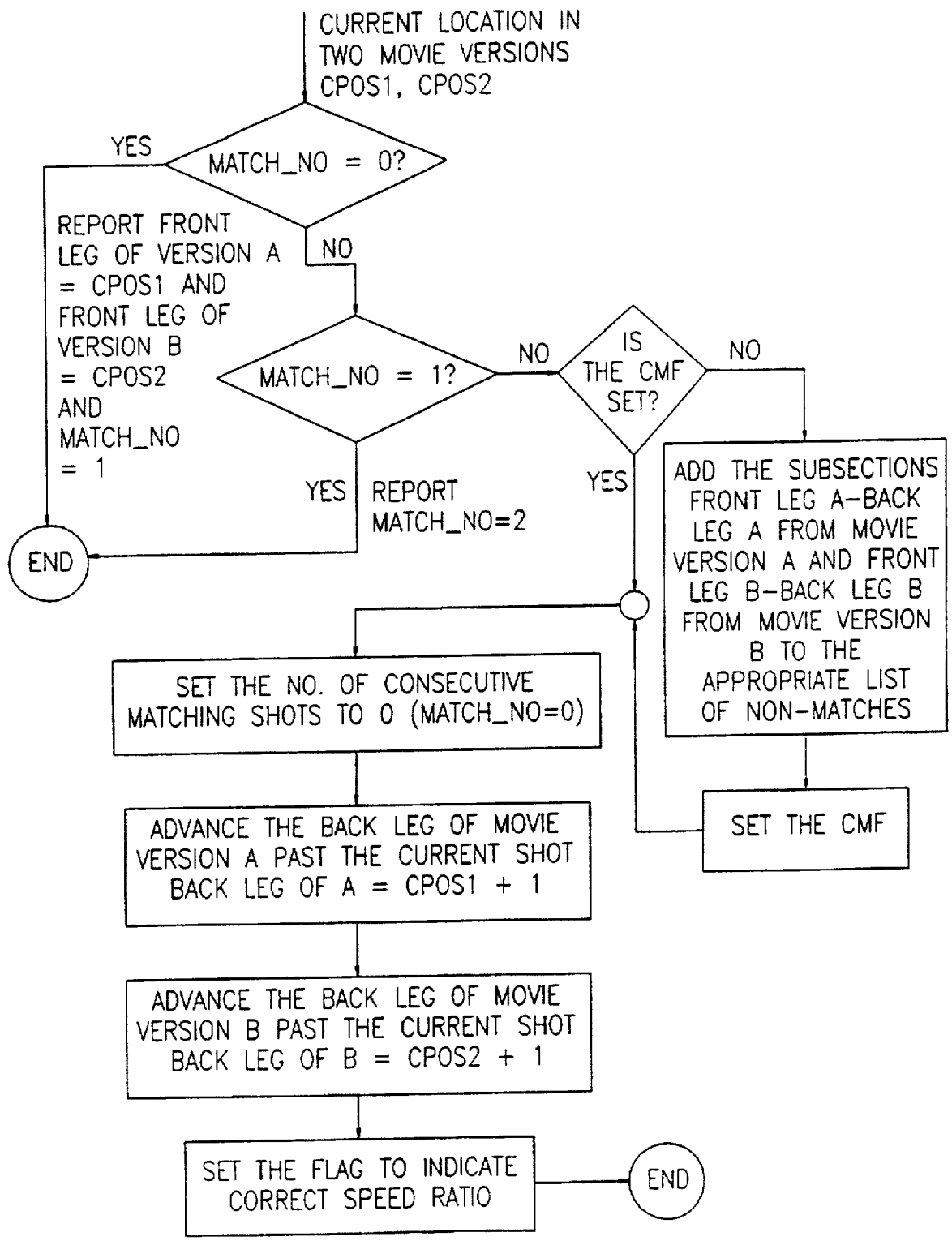
FIG. 9 is a simplified flowchart of a preferred method for performing each of steps 840, 870, 890 and 940 of FIG. 6A.

STEP 840: Perform method "report match" with parameters I and RETPOS. A preferred method for performing step 840 of FIG. 6A is illustrated in FIG. 9.

STEP 870: Perform method "report match" with parameters I and RETPOS. A preferred method for performing step 870 of FIG. 6A is illustrated in FIG. 9.

STEP 890: Perform method "report match" with parameters I and J. A preferred method for performing steps 890 of FIG. 6A is illustrated in FIG. 9.

STEP 940: Perform method "report match" with parameters I and J. A preferred method for performing steps 940 of FIG. 6A is illustrated in FIG. 9.

Reference is now made to FIG. 7 which is a simplified flowchart of a preferred method for performing step 720 of FIG. 6A. The method of FIG. 7 is generally self-explanatory except for the following remarks:

In FIG. 7 the following symbols are used:

ALENGTH is used to refer to the accumulated length of the shot, up to the point of the shot that has already been analyzed; and POS is used to refer to the current position in the longer of the two shots.

Reference is now made to FIGS. 8A and 8B which, taken together, form a simplified flowchart of a preferred method for performing step 780 of FIG. 6A. The method of FIGS. 8A and 8B is largely self-explanatory, except as follows:

STEPS 1010 and 1020: Perform the method "yes-no" on the sequence of k shots to verify synchronization. Two sequences of equal length are being compared in this step. The two sequences are compared on a frame-by-frame basis, using the parameters referred to above. The method "yes-no" reports "yes" if the two sequences are found to be the same based on the frame-by-frame comparison, and "no" if they are found to be different.

Reference is now made to FIG. 9 which is a simplified flowchart of a preferred method for performing each of steps 840, 870, 890 and 940 of FIG. 6A. The method of FIG. 9 is self-explanatory.

Reference is now made to FIG. 10 which is a simplified flowchart of a preferred method for comparing and aligning a single movie-segment with another movie-segment, on a frame-by-frame basis. The method of FIG. 10 is largely self-explanatory, except as follows:

STEP 1030: Perform "begin-end" method. Seek a match between two segments, when one segment is either the beginning or the end of the movie and the two segments are of different length. Based on the assumption that the shorter segment is either from the beginning of the long segment but with the first portion of the long segment missing from the short segment, or from the end of the long segment but with the last portion of the long segment missing from the short segment, an attempt is made to match the two segments. As far as possible, matching is done by checking the general region for a match on a frame-by-frame comparison basis. "Begin-end" reports the location of the shorter section within the longer section.

STEP 1040: Seek a match between the shorter section and either the beginning or the end of the longer section with the method "tail". When the ratio between the size of two sections is less than a threshold value, this indicates that the two sections are relatively long and of relatively similar length. The method "tail" attempts to match the two sections based on the assumption that the shorter section has a missing portion at the end or at the beginning. "Tail" reports the location of the shorter section within the longer section.

STEP 1050: Seek a match between the sections at the frame level with the method "analyze pair of sections recursively". When two sections have an already-identified matching portion, the area on both sides of the matching portion in both movies is searched, on a frame-by-frame basis, in an effort to maximize the matching area. The method reports the location of frames from the first section that were found in the second section.

Reference is now made to FIG. 11 which is a simplified flowchart of a preferred method for carrying out the synchronization refinement step 250 of FIG. 2. The method of FIG. 11 is self-explanatory.

It is appreciated that the movie version alignment methods shown and described herein are useful for a variety of applications which are not limited to merging a plurality of different language movie versions into a single movie version having several languages within its audio track.

Other applications of the present invention include:

a. Generating an "international" soundtrack of a movie by aligning a plurality of different language versions of the movie, and comparing the soundtracks of aligned portions of the movies so as to identify sound which are not common to all language versions and to subtract this language-specific sound.

b. Colorizing a first black-and-white version of a movie in a first language by aligning the first version to a second colored version of the same movie and replacing black and white frames in the first version with the corresponding colored frames in the second version.

c. Transferring a sound track from a first movie version to a second movie version by aligning the first version to the second version and copying the sound track from portions of the first version to the corresponding portions in the second version. One application is when a black and white version in a first language and a colored version in a second language both exist and it is desired to dub the first language into the colored version. Another application is when a first language version exists only in poor video quality and a second language version exists which is of high video quality and it is desired to dub the first language into the second version.

d. Restoring a missing portion of a first version of a movie by aligning the first version to a second version of the same movie in which the same portion is in existence and copying the existing portion from the second version into the correct location within the first version.

e. Generating a movie with, for example, a German audio track and low violence content. The input to the movie generation process includes a plurality of language versions of the same movie which differ not only as to language but also as to the content of the movie. In other words, the audio tracks of the various versions, e.g. English, German and Italian, are each associated with a different sequence of video frames. The input to the movie generation process also includes a plurality of versions of the same movie which differ as to the level of violence content. For example, the plurality of versions may include a high violence content German version and a low violence content English version.

To generate a German language movie version with low violence content, the system generates an intersection between the low violence English version and the German version.

More generally, to generate a movie version which combines features of a plurality of input versions, based only on the input versions, the intersection of the plurality of input versions is generated.

f. The scene analysis and virtual editing unit 340 of FIG. 3 may be employed to store on a CD-ROM or other digital storage device, such as a plurality of editing lists or storage directory, corresponding to a single movie which is typically also stored, at least in part, in digital form, on the CD-ROM.

For example, the plurality of editing lists may correspond to a plurality of ratings of the same movie, such as G, PG, PG13, R and unrated.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited to what has been particularly shown and described hereinabove. Rather, the scope of the present invention is defined only by the claims that follow:

We claim:

1. A method for comparing and aligning first and second image sequences, the method comprising:

for each of the image sequences, identifying shots therein and aligning the image sequences at the shot level, thereby to generate synchronized shot sequences sandwiching unsynchronized portions of the image sequences;

for each first unsynchronized portion and second unsynchronized portion sandwiched between respectively synchronized shot sequences in the first and second image sequences respectively, computing frame-characterizing information quantifying at least a portion of each frame in said first and second unsynchronized portions; and aligning the first and second unsynchronized portions on a frame by frame basis based on said frame-characterizing information without regard to shot-level information.

2. A method according to claim 1 wherein said frame-characterizing information comprises a plurality of representative values comprising central values of a corresponding plurality of small regions within the frame, respectively.

3. A method according to claim 2 wherein said plurality of small regions are distributed along both dimensions of the frame.

4. A method according to claim 2 wherein each said central value comprises the mean pixel value of the pixels within the corresponding small region.

5. A method according to claim 2 wherein said plurality of representative values comprises less than 10 representative values.

6. A method according to claim 2 wherein said plurality of representative values comprises less than 5 representative values.

7. A method according to claim 2 wherein each said small region comprises less than 10.000 pixels.

8. A method according to claim 1 wherein said frame-characterizing information comprises audio frame-level information.

9. A system for comparing and aligning first and second image sequences, the system comprising:

a shot-level aligner operative, for each of the image sequences, to identify shots therein and to align the image sequences at the shot level, thereby to generate synchronized shot sequences sandwiching unsynchronized portions of the image sequences;

a frame characterizer operative, for each first unsynchronized portion and second unsynchronized portion sandwiched between respectively synchronized shot sequences in the first and second image sequences respectively, to compute frame-characterizing information quantifying at least a portion of each frame in said first and second unsynchronized portions; and a frame-level aligner operative to align the first and second unsynchronized portions on a frame by frame basis based on said frame-characterizing information without regard to shot-level information.

* * * * *